US005992181A

United States Patent [19]
Geertman

[11] Patent Number: 5,992,181
[45] Date of Patent: Nov. 30, 1999

[54] METHOD OF RANDOMLY IRRADIATING AN OPTICAL FIBER CORE WITH A LASER

[75] Inventor: Robert E. M. Geertman, Veldhoven, Netherlands

[73] Assignee: Plasma Optical Fibre B.V., Eindhoven, Netherlands

[21] Appl. No.: 09/031,330

[22] Filed: Feb. 26, 1998

Related U.S. Application Data

[63] Continuation of application No. 08/593,995, Mar. 30, 1996, abandoned.

[30] Foreign Application Priority Data

Feb. 1, 1995 [EP] European Pat. Off. .............. 95200239

[51] Int. Cl.⁶ .................................................. C03B 37/018
[52] U.S. Cl. .......................... 65/392; 65/425; 250/492.1; 430/290; 430/321
[58] Field of Search .................. 65/392, 425; 250/492.1; 430/290, 321

[56] References Cited

U.S. PATENT DOCUMENTS

| 4,129,433 | 12/1978 | Jaeger ........................................ 65/392 |
| 5,298,047 | 3/1994 | Hart, Jr. et al. ......................... 65/3.11 |
| 5,400,420 | 3/1995 | Askin et al. .............................. 385/37 |

FOREIGN PATENT DOCUMENTS

| 45345 | 2/1982 | European Pat. Off. ................. 65/425 |
| 0604039A2 | 6/1994 | European Pat. Off. . |
| WO9419713 | 9/1994 | WIPO . |

OTHER PUBLICATIONS

Foreign Search Report dated Apr. 2, 1996 (Internation Application No. PCT/IB/96100060.

"Fiber Laser Sources and Amplifiers II", by Russell et al., SPIE Conf. Pro. Vol. 1373 (1990), Fiber Laser Sources and Amplifiers II, pp. 126–139.

*Primary Examiner*—John Hoffmann
*Attorney, Agent, or Firm*—Seed and Berry LLP

[57] ABSTRACT

A method of manufacturing an optical fiber having a core portion doped with a dopant and a surrounding optical cladding portion is disclosed. The method comprises the steps of drawing a fiber from a molten extremity of a silica preform and moving the fiber along towards a device for coating it with a protective sheath. Prior to the coating step, the moving fiber is irradiated with irregularly modulated actinic radiation, thereby causing corresponding irregular variations in the refractive index of its core portion as a function of longitudinal position. The resulting fiber demonstrates a significantly reduced polarisation mode dispersion.

4 Claims, 2 Drawing Sheets

METHOD OF RANDOMLY IRRADIATING AN OPTICAL FIBER CORE WITH A LASER

This is a continuation of application Ser. No. 08/593,995, filed Jan. 30, 1996, now abandoned.

BACKGROUND OF THE INVENTION

1. Field of the Invention

The invention relates to a method of manufacturing an optical fiber comprising a core portion with a dopant and a surrounding optical cladding portion, comprising the steps of drawing a fiber from a molten extremity of a silica preform and moving the fiber along means for coating it with a protective sheath. In particular, the invention relates to an optical fiber having reduced polarisation mode dispersion.

2. Discussion of the Related Art

The term "polarisation mode dispersion" (PMD) refers to the dispersion of signals carried by an optical fiber (particularly a single mode fiber), as a result of birefringence in the fiber's core portion. This birefringence is caused by imperfections in the fiber, such as slight non-circularity of its core cross section, asymmetrical lateral stress, etc., and manifests itself in dissimilar refractive indices for a carried signal's two orthogonal polarisation modes. In the case of a perfect fiber devoid of PMD, these two modes propagate independently of one another at a common velocity. However, in the presence of PMD, the relative phase of the two modes changes continually, returning to a particular configuration at certain spatial intervals along the fiber. The average such interval is referred to as the beat length $L_p$ of the fiber, and has a typical magnitude of the order of 1 m (meter).

A method as stated in the opening paragraph is known from U.S. Pat. No. 5,298,047, wherein, subsequent to the fiber coating step, the moving fiber is caused to pass over a series of pulleys. By continually canting the rotational axis of at least one of these pulleys back and forth in an irregular manner (i.e. with a variable frequency), the fiber is subjected to an oscillatory torque which causes the entire length of fiber between the canting pulley and the preform to twist back and forth. Such twisting of warm, uncoated fiber impresses an oscillatory axial spin upon its constituent material, and this spin subsequently becomes "frozen" into the fiber as it cools. The deliberate presence of such variable spin-related stress in the fiber produces continual mode-coupling between the orthogonal polarisation modes of a carried signal, thereby inhibiting the accumulation of a significant phase lag between the two modes, and consequently causing a significant reduction in the fiber's PMD.

SUMMARY OF THE INVENTION

It is an object of the invention to provide an alternative method by which an optical fiber having reduced PMD can be manufactured. In particular, it is an object of the invention that the specific means of achieving the said reduction in PMD should not necessitate mechanical contact with the fiber. Moreover, it is an object of the invention that the furnished alternative method be relatively cheap and easy to implement in existing fiber drawing arrangements. Specifically, it is an object of the invention to provide an optical fiber in which a significantly reduced PMD is achieved by a mechanism other than the presence of variable spin-related mechanical stress in the fiber.

These and other objects are achieved according to the invention in a method of manufacturing an optical fiber comprising a core portion with a dopant and a surrounding optical cladding portion, comprising the steps of drawing a fiber from a molten extremity of a silica preform and moving the fiber along means for coating it with a protective sheath, characterised in that, prior to the coating step, the moving fiber is irradiated with irregularly modulated actinic radiation, thereby causing corresponding irregular variations in the refractive index of its core portion as a function of longitudinal position.

The term "silica" is here intended to refer to any form of $SiO_2$, whether amorphous or crystalline, synthetic or natural; the skilled artisan will understand that such silica typically comprises relatively small quantities of certain dopants (such as F or Ge, for example) so as to modify its refractive index. The term "actinic radiation" as here employed should be interpreted as referring to such forms of radiation as ultra-violet (UV) radiation, X-rays, electron beams, etc., as well as to visible electromagnetic radiation of relatively short wavelength, such as green or blue light. Such radiation is here considered to be "modulated" when its intensity, wavelength or energy per particle are temporally varied, either directly at the source or with the aid of temporally adjustable eclipsing or deflecting means, such as a shutter. Such modulation is regarded as being "irregular" when the temporal separation of adjacent local maxima is not constant, so that the corresponding refractive index variations along substantial lengths of the fiber core do not occur at constant intervals.

It should be understood that the inventive exposure to modulated actinic radiation preferably occurs along substantially the entire length of optical fiber drawn in one go from the preform (typically of the order of 100 km), or at least along a plurality of individual portions of substantial length (of the order of 10–100 m) with possible interposed portions of non-irradiated fiber.

The invention draws from the insight that, when exposed to actinic radiation of an appropriate energy, the electronic structure of dopants in the fiber's core portion can be altered in such a way as to locally increase the refractive index of the doped core material in the irradiated portion concerned. When such localised refractive index changes are disposed at irregular intervals along the length of the fiber core (in accordance with the invention), they instigate continual mode-coupling between the different polarisation modes of a signal propagating within the core, with an attendant significant reduction in PMD. Because the inventive irradiation leads to a local increase in the refractive index $n_{co}$ of the core portion, and because $n_{co}$ is already larger than the refractive index $n_{cl}$ of the surrounding optical cladding portion, the essential condition $n_{co} > n_{cl}$ for the occurrence of Total Internal Reflection in the fiber core is maintained.

As a specific example, in the case of a $GeO_2$ dopant distributed throughout a silica core, irradiation of ground-state Ge atoms with actinic radiation (such as UV radiation) can lead to partial production of stable Ge(1) and Ge(2) excited states, whereby the obtained value of the atomic ratio Ge:Ge(1):Ge(2) depends on the particular type of actinic radiation employed. As a consequence, the refractive index of the Ge-doped core portion increases. This process is elucidated in more detail in an article by Russell et al. in SPIE Conference Proceedings Vol. 1373 (1990), *Fiber Laser Sources and Amplifiers II*, pp 126–139.

Other core dopants whose electronic structure can be modified using actinic irradiation include, for example, P (phosphorous) and Al (aluminium).

It is a particular advantage that the means for enacting the inventive irradiation do not necessitate mechanical contact with the fiber, and can be embodied in a very compact form (such as, for example, a laser beam, arc lamp or thermionic gun).

The coating means referred to hereabove may be of any type suitable for application in the art of optical fiber manufacture. For example, such means may comprise a chamber through which the moving fiber is guided and into which a reactive hydrocarbon gas is introduced, the chamber being further provided with heating means (e.g. inductive or microwave heating means) for the purpose of warming the fiber, thereby serving to increase the rate of deposition of a solid hydrocarbon layer (out of the gas phase) onto the fiber's surface. The inventive irradiation process occurs prior to the coating step, since the employed actinic radiation might otherwise suffer absorption in the fiber's protective sheath.

It must be stipulated that it is not essential that the fiber be either soft or warm during the inventive irradiation process. On the other hand, if the fiber retains some amount of heat for a short time after being drawn, this will not inhibit the inventive method, unless the temperature of the fiber is high enough to provoke de-excitation of excited dopant states (occurring above about 700° C. in the case of UV-irradiated Ge dopants, for example).

A particularly effective PMD-reduction is obtained according to the invention when $d_m < L_p$, where $d_m$ is the average longitudinal separation of neighbouring localised zones of increased $n_{co}$. Preferably, $d_m$ is several times smaller than $L_p$; for example, if $L_p \approx 2$ m, then $d_m$ should preferably (but not essentially) have a maximum value of about 1 m, and favourably a value of about 0.3–0.4 m (approximately five modulations per beat length). The obtained value of $d_m$ will, of course, depend on the linear velocity $v_f$ of the moving fiber and on the average modulation time $t_r$ of the actinic radiation. For example, if $v_f=10$ m/s, then $t_r$ must have a value of 0.05 s in order to obtain $d_m=0.5$ m. It should be noted that the term "average" is here intended to refer to the arithmetic average taken over a substantial length of the optical fiber (e.g. 100 m) or a substantial time interval (e.g. 10 s).

Although different types of actinic radiation are, in principle, suitable for application in the inventive method, there may be a practical preference for the use of electromagnetic radiation, since this can easily be produced at high intensity from a cheap and compact source, and can easily be modulated using, for example, a shutter or pulsed power supply. In particular, the inventors have achieved highly satisfactory PMD-reduction in Ge-doped silica fibers with the aid of UV or blue/green light from a laser source of randomly-pulsed intensity. UV light is hereby understood to have a wavelength in the range 230–260 nm, and preferably a value of approximately 244 nm, and blue/green light should be considered as having a wavelength in the range 460–520 nm, and preferably an approximate value of either 488 or 514 nm.

Besides such random pulsing of the actinic radiation, there are several other possible ways of achieving the desired irregular modulation in accordance with the invention. For example, such modulation may take any of the following forms:

(1) a constant-amplitude block, triangular or sinusoidal wave, whose frequency is modulated in a random manner;
(2) alternated pulse doublets and triplets of unequal temporal pitch;
(3) a superposition of at least two periodic block functions having respective periods $P_1$ and $P_2$ such that the value of the ratio $P_1/P_2$ is not an integer.

This list of examples is by no means exhaustive, and is given merely for illustrative purposes.

The selected intensity of the employed actinic radiation will depend inter alia on the value of $t_r$ and the concentration of dopants in the core portion of the optical fiber, in view of the statistical nature of the radiative mechanism by which the electronic structure of the core dopants is altered. The skilled artisan will be capable of tailoring the applied radiative intensity to the particular parameters in a given manufacturing situation. In the case of UV or blue/green laser light, the inventors have obtained satisfactory results with laser powers of the order of 0.1–1 W.

BRIEF DESCRIPTION OF THE DRAWINGS

The invention and its attendant advantages will be further elucidated with the aid of exemplary embodiments and the accompanying schematic drawings, not of uniform scale, whereby.

DETAILED DESCRIPTION OF THE PREFERRED EMBODIMENTS

Embodiment 1

Figure 1:
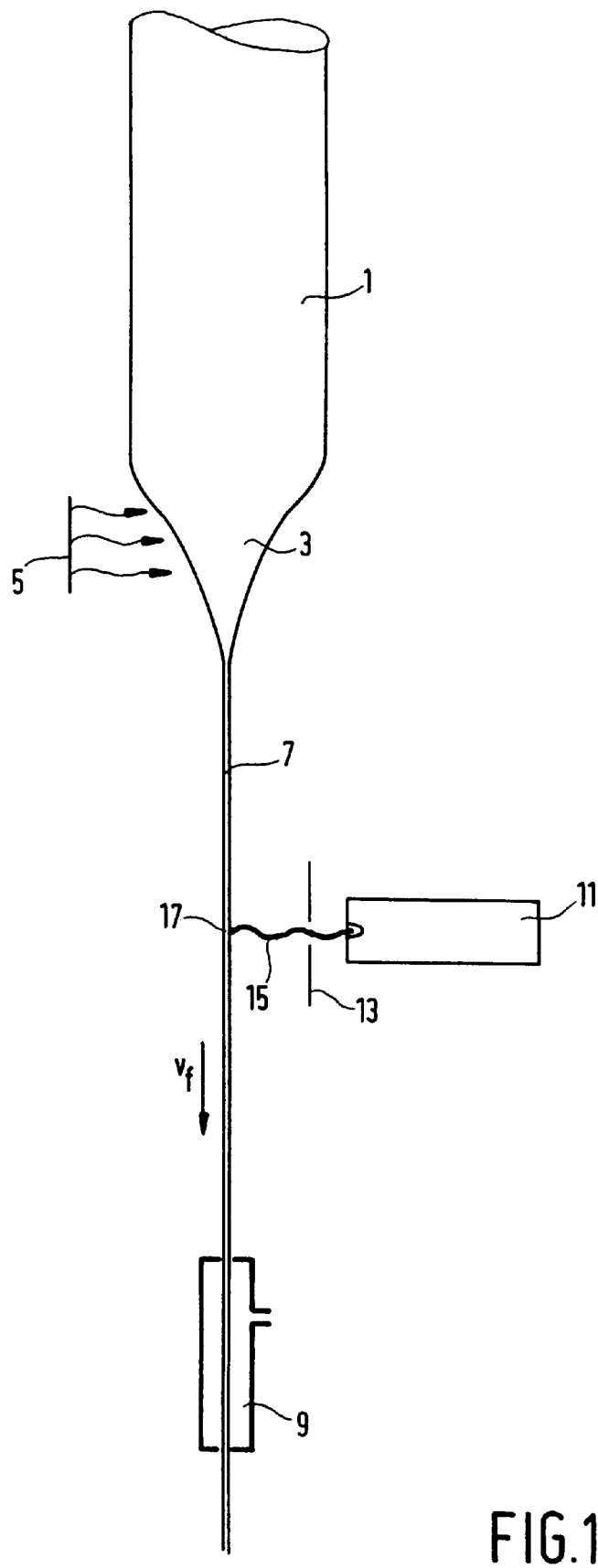
FIG. 1 depicts a process of manufacture of an optical fiber in accordance with the invention.

FIG. 1 depicts a procedure for manufacturing an optical fiber in accordance with the present invention.

A silica preform 1 is manufactured, for example, by depositing doped layers of synthetic silica on the inside surface of a silica substrate tube (e.g. using Plasma Chemical Vapour Deposition), and subsequently thermally collapsing the tube into a preform rod. By using different dopants (such as F (fluorine) and Ge (germanium)) during this deposition procedure, the resulting preform rod is thus embodied that its core silica has a higher refractive index than the silica in its outer reaches. For example, the rod may be manufactured in such a way that its outer regions (corresponding to the optical cladding portion of the drawn fiber) are doped with approximately 1 at. % F and 1 mol. % $GeO_2$, whereas its core region (corresponding to the core portion of the drawn fiber) is doped with approximately 1 at. % F and 5 mol. % $GeO_2$. If so desired, the resulting preform rod can be subsequently encased in a silica jacketing tube. In any case, the final product constitutes the preform 1.

The manufacture of such a preform 1 can, of course, occur using a variety of other well known methods. The specific method used is of no particular importance to the subsequent enaction of the optical fiber manufacturing process in accordance with the invention, hereinafter further elucidated.

The preform rod 1 is heated at an extremity 3 using heating means 5. From this heated extremity 3, a fiber 7 is drawn away with a linear velocity $v_f$. This fiber comprises a central core portion which is surrounded by an optical cladding portion. The fiber 7 is subsequently moved through coating means 9, where it is provided with a protective sheath (e.g. an opaque polymer coating).

At a location between the extremity 3 and the coating means 9, the moving fiber 7 is locally irradiated with irregularly modulated actinic radiation 15. As here depicted, the radiation beam 15 is derived from a spatially fixed source 11 which is located behind a shutter 13. In a particular example, the beam 15 comprises blue/green light, the source 11 is a 0.2 W Ar laser beam of substantially constant intensity, and the shutter 13 is abruptly opened and closed in a random manner (e.g. by controlling it with a servo device operating with a duty cycle which is determined by a processor unit acting as a random number generator); in this way, the moving fiber 7 is subjected to random pulses (or blocks) of blue/green light.

At points 17 where the beam 15 intercepts the fiber 7, the refractive index $n_{co}$ of the core portion of the fiber 7 will be increased. This increase in $n_{co}$ will, of course, occur along the whole trajectory of the fiber 7 exposed to any given dose (i.e. pulse or block) of actinic radiation 15. For example, if $v_f$=10 m/s and the shutter 13 is opened for an interval of 0.005 s, then the length of the fiber 7 thus exposed to actinic radiation will be 10×0.005 m=0.05 m=50 mm, so that $n_{co}$ will increase along a length 50 mm.

Assuming a $GeO_2$ dopant concentration of 5 mol. % and an intensity of 0.2 W for the beam 15, the refractive index $n_{co}$ will typically increase by about 0.01% upon irradiation.

Embodiment 2

Figure 2:
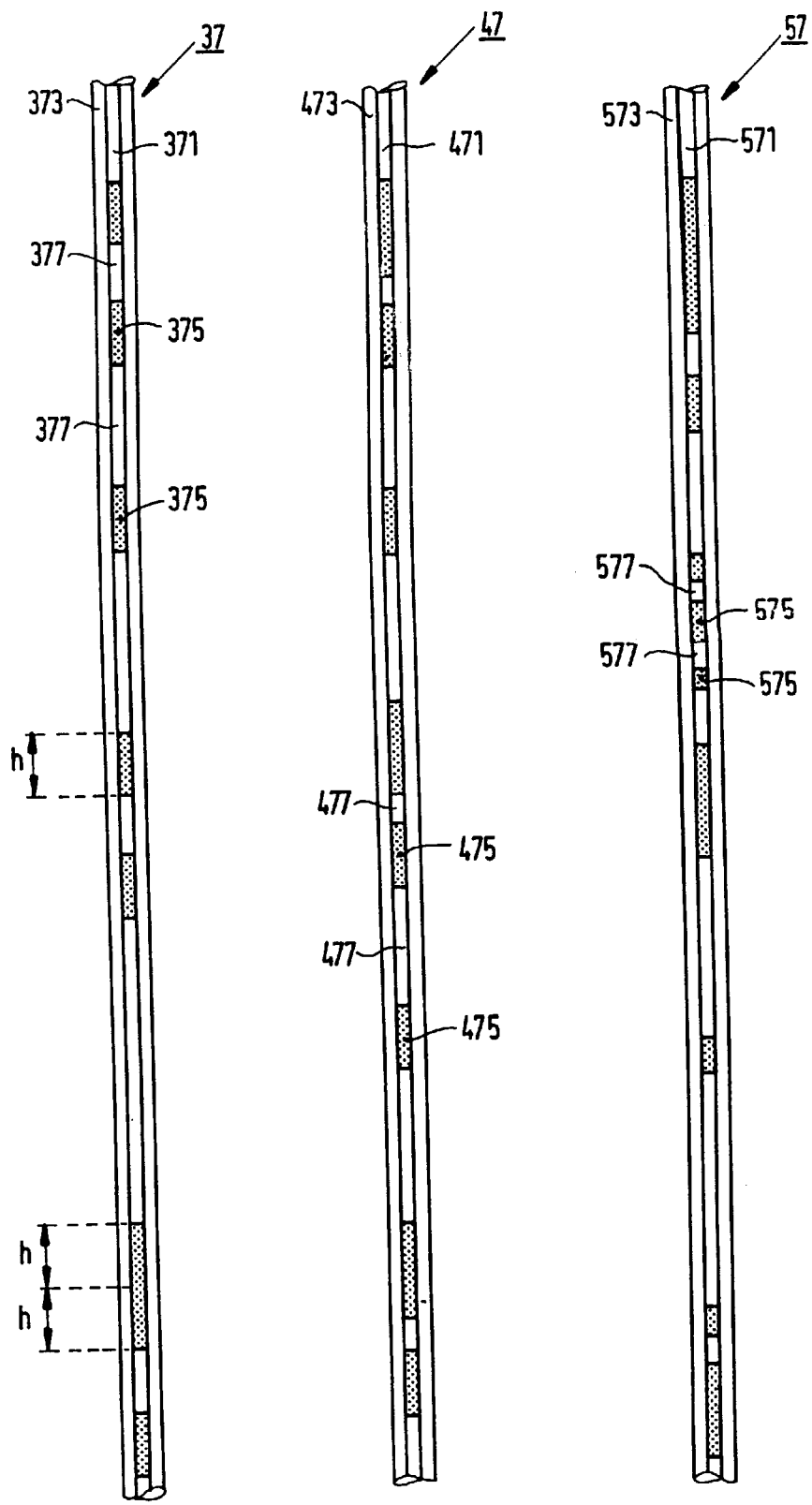
FIG. 2 shows some exemplary optical fibers in accordance with the invention, with a stylised representation of the longitudinal refractive index variations in their core portions.

FIG. 2 depicts segments of three optical fibers 37, 47, 57 manufactured in accordance with different possible variants of the current inventive method. These fibers comprise respective core portions 371, 471, 571 which are surrounded by respective optical cladding portions 373, 473, 573. The fibers' co protective sheaths are not depicted in the Figure, for the sake of clarity. As a specific example, the core portions 371, 471, 571 may comprise Ge-doped silica, and the optical cladding portions 373, 473, 573 may comprise F-doped silica.

The refractive index $n_{co}$ of each core portion 371, 471, 571 exceeds the refractive index $n_{cl}$ of the corresponding optical cladding portion 373, 473, 573. However, $n_{co}$ does not have a constant value as a function of longitudinal position along the different fibers 37, 47, 57. Instead, each of the fiber core portions 371, 471, 571 respectively comprises irregularly spaced zones 375, 475, 575 (shaded in the Figure) in which $n_{co}$ demonstrates a local maximum value, with intervening zones 377, 477, 577 (not shaded) where $n_{co}$ has a locally lower value. The irregularly spaced zones 375, 475, 575 are preferably disposed along substantially the whole length (typically of the order of 100 km) of the respective fibers 37, 47, 57, or at least disposed along several very substantial lengths (of the order of 10–100 m) thereof.

In the case of fiber 37, the zones 375 all have the same length h, but are disposed at variable separations in the longitudinal direction, i.e. the zones 377 are not of constant length. Such a pattern of zones 375, 377 can be achieved in an embodiment of the inventive method whereby the actinic radiation is modulated according to a block function comprising on-blocks of constant temporal duration disposed at random temporal intervals.

In fiber 47, neither the zones 475 nor the zones 477 are of constant length. However, the pattern of zones 475, 477 demonstrates a certain periodicity, since it repeats itself after each set of three consecutive zones 475. Such periodicity may be obtained in an embodiment of the inventive method whereby constant-intensity actinic radiation is directed onto the moving fiber via an eclipsing device comprising a continually rotating disc with three different azimuthal apertures.

In the case of fiber 57, there is no periodicity in the pattern of zones 575, 577. Such a pattern may be achieved in an embodiment of the inventive method whereby the actinic radiation is derived from a randomly pulsed source.

As here depicted, all the shaded zones are sharply delimited by abrupt borders. In practice, however, there may also be a gradual fluctuation in $n_{co}$, so that the obtained patterns are less discontinuous in appearance (as in the case of frequency-modulated sinusoidal irradiation, for example).

I claim:

1. A method of manufacturing an optical fiber comprising:

drawing a fiber having a core portion from a molten extremity of a preform;

moving the drawn fiber;

generating radiation from a randomly pulsed laser source; and irradiating the moving fiber with the radiation, thereby causing random variations in the refractive index of the core portion of the fiber as a function of longitudinal position.

2. The method of manufacturing an optical fiber of claim 1 wherein the radiation comprises radiation with a wavelength within the range of 230 nm to 520 nm.

3. The method of manufacturing an optical fiber of claim 1 wherein the randomly pulsed laser source is randomly pulsed to produce radiation in a random manner.

4. The method of manufacturing an optical fiber of claim 1, further comprising applying a protective coating to the fiber.

* * * * *

UNITED STATES PATENT AND TRADEMARK OFFICE
CERTIFICATE OF CORRECTION

PATENT NO. : 5,992,181
DATED : November 30, 1999
INVENTOR(S) : Robert E. M. Geertman It is certified that error appears in the above-identified patent and that said Letters Patent is hereby corrected as shown below:

On the cover page, item [63] after "08/593,995," please delete "Mar. 30, 1996," and insert therefor "Jan. 30, 1996,"

Signed and Sealed this

Nineteenth Day of December, 2000

Attest:

Q. TODD DICKINSON

*Attesting Officer*     *Commissioner of Patents and Trademarks*